United States Patent
Ito et al.

(10) Patent No.: US 7,892,678 B2
(45) Date of Patent: Feb. 22, 2011

(54) HYDROGEN ABSORBING ALLOY POWDER AND NICKEL-METAL HYDRIDE BATTERY USING THE SAME

(75) Inventors: Shinichiro Ito, Kosai (JP); Hiroyuki Sakamoto, Toyohashi (JP); Shinichi Yuasa, Kyotanabe (JP)

(73) Assignee: Toyota Jidosha Kabushiki Kaisha, Toyota, Aichi-ken (JP)

( * ) Notice: Subject to any disclaimer, the term of this patent is extended or adjusted under 35 U.S.C. 154(b) by 1251 days.

(21) Appl. No.: 11/480,361

(22) Filed: Jul. 5, 2006

(65) Prior Publication Data

US 2007/0009796 A1    Jan. 11, 2007

(30) Foreign Application Priority Data

Jul. 5, 2005   (JP)   .............................. 2005-195746

(51) Int. Cl.
*H01M 4/58* (2010.01)
*C22C 19/03* (2006.01)

(52) U.S. Cl. .................................... 429/218.2; 420/455

(58) Field of Classification Search .............. 429/218.2; 420/455

See application file for complete search history.

(56) References Cited

U.S. PATENT DOCUMENTS 6,106,769 A * 8/2000 Shinya et al. ............... 420/416
2001/0041292 A1 * 11/2001 Hayashida et al. ....... 429/218.2

FOREIGN PATENT DOCUMENTS

JP    2002-256301    9/2002

* cited by examiner

*Primary Examiner*—Patrick Ryan
*Assistant Examiner*—Karie O'Neill Apicella
(74) *Attorney, Agent, or Firm*—Finnegan, Henderson, Farabow, Garrett & Dunner, LLP

(57) ABSTRACT

A hydrogen absorbing alloy powder includes an intermetallic compound having an $AB_5$ type crystal structure and containing La for an A site element and Ni for a B site element. The powder contains La by 20 wt % or more and metallic Ni by from 2.0 wt % to 10 wt %, and acicular or grain shape precipitates containing $La(OH)_3$ are deposited on a surface thereof. The powder has an intensity ratio P2/P1 satisfying a relation: $P2/P1 \geq 0.02$, where P1 is a peak intensity appearing in the vicinity of: diffraction angle $2\theta=42.5$ deg and showing (111) face of $LaNi_5$ and P2 is a peak intensity appearing in the vicinity of: diffraction angle $2\theta=15.8$ deg and showing (100) face of $La(OH)_3$ in the X-ray diffractometry using $CuK\alpha$ rays.

5 Claims, 6 Drawing Sheets

HYDROGEN ABSORBING ALLOY POWDER AND NICKEL-METAL HYDRIDE BATTERY USING THE SAME

BACKGROUND OF THE INVENTION

1. Field of the Invention

The present invention relates to a hydrogen absorbing alloy powder comprising a hydrogen absorbing alloy and used, for example, in nickel-metal hydride batteries, and a nickel-metal hydride battery using the same.

2. Description of the Related Art

Since electrodes using hydrogen absorbing alloy powder have a theoretical capacitance density larger than that of cadmium electrode and do not suffer from deformation or cause formation of dendrites such as in zinc electrodes, they have long life and result in no public pollution. In addition, since they show high energy density, they are often used, for example, as a power supply for use in small-sized portable devices as a negative electrode of nickel-metal hydride batteries. The nickel-metal hydride batteries have attracted attention in recent years also as electric sources for engine power such as for electric vehicles or hybrid cars and it has been strongly demanded for the improvement in output characteristics or storage characteristics.

One of the methods includes a treatment of increasing the activity of a hydrogen absorbing alloy powder used as the negative electrode active material of nickel-metal hydride batteries and various proposals have been given.

One of them is disclosed in Jpn. unexamined patent publication No. 2002-256301. For providing an alloy powder for use in an electrode capable of providing alkali batteries excellent in high rate discharging characteristics, self-discharging characteristics, and cycle characteristics, this publication '301 discloses a method of producing an alloy powder for use in an electrode, including a first step of dipping a starting material comprising a hydrogen absorbing alloy containing from 20% to 70% by weight of Ni in an aqueous solution that contains from 30% to 80% by weight of sodium hydroxide at 90° C. or higher, and a second step of water washing the powder applied with the first step.

BRIEF SUMMARY OF THE INVENTION

However, the method of providing the alloy powder for use in electrodes described in the above publication '301 has a wide range of application use. It therefore has been found that the internal resistance value and the preservation characteristics of the thus produced nickel-metal hydride batteries are different depending on the composition of the hydrogen absorbing alloy powder, the time for the treatment, etc. even in the nickel-metal hydride battery using the hydrogen absorbing alloy powder treated by the treating method described therein as the negative electrode.

The present invention has been made in view of the above circumstances and has an object to provide a hydrogen absorbing alloy powder with low inner resistance and improving storage characteristics of batteries, and a nickel-metal hydride battery using the same.

To achieve the purpose, the present invention provides a hydrogen absorbing alloy powder including metallic Ni and an intermetallic compound having an $AB_5$ type crystal structure and containing La for an A site element and Ni for a B site element, wherein the powder contains La by 20 wt % or more and metallic Ni by 2.0 wt % to 10 wt %, the powder has a surface on which acicular or grain shape precipitates containing $La(OH)_3$ are deposited, and the powder has an intensity ratio P2/P1 satisfying a relation: $P2/P1 \geq 0.02$, where P1 is a peak intensity appearing in the vicinity of: diffraction angle $2\theta = 42.5$ deg and showing (111) face of $LaNi_5$ and P2 is a peak intensity appearing in the vicinity of: diffraction angle $2\theta = 15.8$ deg and showing (100) face of $La(OH)_3$ in an X-ray diffractometry using CuKα rays.

The hydrogen absorbing alloy powder according to the invention is a so-called $LaNi_5$ series hydrogen absorbing alloy powder having an intermetallic compound and having an $AB_5$ type crystal structure containing La for the A site element and Ni for the B site element. In addition, the alloy contains La by as mush as 20 wt % or more. It further contains 2 wt % to 10 wt % of metallic Ni liberated from the $AB_5$ type crystal structure. Furthermore, acicular or grain shape precipitates containing $La(OH)_3$ are deposited on the surface thereof and the ratio between peaks P1 and P2 is:

$P2/P1 \geq 0.02$ in XRD.

That is, in the alloy powder of high La content, more amount of $La(OH)_3$ is contained in the precipitates based on the amount of $LaNi_5$ as the standard.

The hydrogen absorbing alloy powder according to the invention, in a case of preparing a nickel-metal hydride battery using the powder as the negative electrode active material, can lower the internal resistance value of the battery, as well as the storage characteristics of the nickel-metal hydride battery, specifically, the residual capacity in a self-discharge test after the long time storage is improved.

While the reason has not yet been apparent, it may be considered that the internal resistance of the battery is lowered since the amount of metallic Ni has a certain extent of value and this provides an effect as a catalyst for the hydrogen adsorption and desorption by metallic Ni. Further, as the existence amount of $La(OH)_3$ represented by the ratio P2/P1 increases, that is, the acicular or grain shape precipitates containing $La(OH)_3$ increase at the surface of the hydrogen absorbing alloy powder containing a great amount of La and, particularly, $La(OH)_3$ increases, the precipitates function effectively as a corrosion resistant protective layer against an electrolyte, and this improves the self-discharging characteristics after long time storage of the nickel-metal hydride battery using the alloy powder as the negative electrode.

In the above hydrogen absorbing alloy powder, preferably, the powder has an intensity ratio P4/P3 satisfying a relation: $P4/P3 \leq 0.9$, where P3 is a peak intensity appearing in the vicinity of: diffraction angle $2\theta = 28.3$ deg and showing (101) face of $La(OH)_3$ and P4 is a peak intensity appearing in the vicinity of: diffraction angle $2\theta = 27.5$ deg and showing (110) face of $La(OH)_3$ in the X-ray diffractometry using CuKα rays.

In the hydrogen absorbing alloy powder according to the invention, the ratio P4/P3 is: $P4/P3 \leq 0.9$. The nickel-metal hydride battery using such alloy powder described above as the negative electrode can have excellent self-discharging characteristics after the long time storage.

While the reason is not still apparent as well, since P3 represents the homogeneity of (101) face (c-axis direction) of $La(OH)_3$ crystals and P4 represents the homogeneity of (110) face (in the direction of a-axis and c-axis), the ratio P4/P3 shows the homogeneity in the direction of a-axis of the $La(OH)_3$ crystals of the precipitates on the surface of the alloy powder. In the alloy powder of the invention, since the ratio P4/P3 is: $P4/P3 \leq 0.9$ which is less than 1, $La(OH)_3$ contained in the precipitates is not oriented along the a-axis but shows strong orientation along the c-axis. It is considered that the function of the precipitates as the corrosion resistant protective layer against the electrolyte becomes excellent by precipitation of precipitates containing $La(OH)_3$ crystals of such high c-axis orientation.

In the above hydrogen absorbing alloy powder, preferably, the powder contains the metallic Ni by 2.0 wt % to 6.0 wt %.

The hydrogen absorbing alloy powder of the invention contains metallic Ni by 2.0 wt % to 6.0 wt %. As described above, since the metallic Ni functions as the catalyst, it is considered to have a function of lowering the internal resistance of the battery. However, in a case where the amount of metallic Ni is excessive, the alloy relevant to the charge/discharge among the alloy powder becomes excessively small relatively, which rather shows a tendency to increase the internal resistance of the battery. Therefore, it is more appropriate to define the content within the range described above.

In the above hydrogen absorbing alloy powder, preferably, a weight ratio Wc/Wn for the weight Wc of Co and the weight Wn of Ni contained in the hydrogen absorbing alloy powder is: $Wc/Wn \leq 0.10$.

In the hydrogen absorbing alloy powder of the invention, Co contained in the alloy powder is decreased as: $Wc/Wn \leq 0.10$. Such an alloy powder when compared with those of more Co amount, can easily produce a great amount of metallic Ni by treating the alloy powder to form metallic Ni and precipitating the precipitates, and can also produce a great amount of precipitates. Accordingly, an alloy powder of good productivity and excellent physical property can be produced.

Further, the hydrogen absorbing alloy powder according to the invention and preferred embodiments thereof may be used preferably as the negative electrode active material.

Since the nickel-metal hydride battery according to the invention uses the hydrogen absorbing alloy powder described above as the negative electrode active material, the internal resistance of the battery can be lowered to provide a battery also excellent in the self-discharging characteristics after long time storage.

DETAILED DESCRIPTION OF THE PREFERRED EMBODIMENTS

A hydrogen absorbing alloy powder according to the present invention will be described in the following preferred embodiments in conjunction with each of tables, and a battery according to the invention using the hydrogen absorbing alloy powder will be described in the preferred embodiments with reference to the drawings.

At first, Mm (Misch metal), La, Ni, Co, Al, and Mn were mixed each at a predetermined ratio, melted in a high frequency melting furnace to prepare an ingot of an $LaNi_5$ series alloy, specifically, a hydrogen absorbing alloy with a composition of $MmAl_{0.3}Mn_{0.4}Co_{0.75}Ni_{3.55}$, which was then heat treated at 1060° C. for 10 hours in an argon atmosphere. The hydrogen absorbing alloy of the composition contained 22 wt % of La. After pulverizing the ingot into coarse particles, they were powderized in the presence of water by using a wet ball mill and passed through a sieve with an opening of 75 μm to obtain an alloy powder comprising a hydrogen absorbing alloy of an average grain size of 20 μm.

Then, the thus obtained alloy powder was dipped in an aqueous solution at 100° C. containing 35 wt % of NaOH and stirred for one hour. Since the alloy powder obtained by using the wet ball mill contains a water content, the concentration of NaOH of the aqueous solution was controlled to the value described above while taking the water content into consideration.

Then, procedures of mixing the alloy powder with hot water, stirring and then dewatering the same under a pressure were repeated till the pH of the hot water after use was lowered to 9 or less and then the alloy powder was dried.

Then, alloy powders of Example 2, and Comparative Examples 1, 2 using different treating time using the aqueous solution of NaOH, Comparative Examples 3 and 4 using 35 wt % KOH as the treating solution, and Comparative Example 5 including a treatment using acetic acid after treatment with KOH were also prepared in the same manner.

Figure 1:
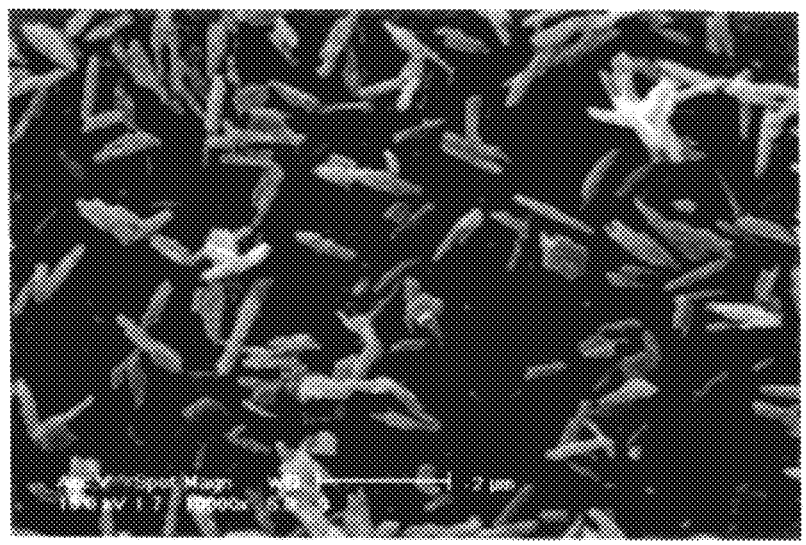
FIG. 1 is an SEM photograph showing the surface of a hydrogen absorbing alloy powder in Example 1.
Figure 2:
FIG. 2 is an SEM photograph showing the surface of a hydrogen absorbing alloy powder in Comparative Example 3.
Figure 3:
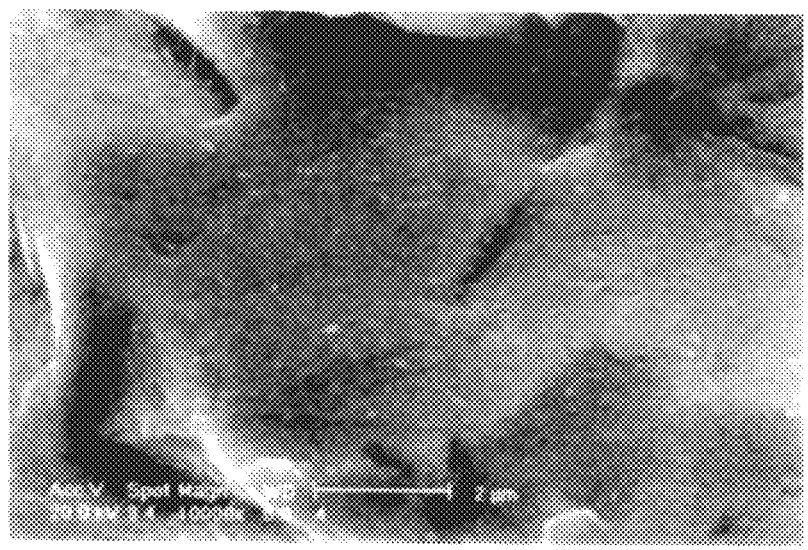
FIG. 3 is an SEM photograph showing the surface of a hydrogen absorbing alloy powder in Comparative Example 5.

FIGS. 1 to 3 show SEM photographs for the surface of alloy powder in Example 1 and Comparative Examples 3 and 5, respectively. As shown in FIG. 1, acicular or grain shape crystalline precipitates were deposited on the entire surface of the alloy powders in Examples 1 and 2 treated with NaOH. It was also found that the precipitates were crystalline precipitates mainly comprising $La(OH)_3$. On the other hand, in the alloy powder of Comparative Examples 3 and 4 applied with the treatment by KOH, while acicular precipitates were deposited, the amount of the precipitates was small and the size was also small as shown in FIG. 2. In addition, as shown in FIG. 3, in the alloy powder of Comparative Example 5 treated with KOH and, further, treated with acetic acid, deposition of precipitates was not observed on the surface. It is considered that the precipitates were removed by acetic acid.

Then, for the alloy powder of each of the examples and the comparative examples, X-ray diffractometry (XRD) was conducted by using CuKα rays to measure the peak intensity P1 showing (111) face of $LaNi_5$ appearing in the vicinity of: diffraction angle 2θ=42.5 deg, and a peak intensity P2 showing (100) face of $La(OH)_3$ appearing in the vicinity of: diffraction angle 2θ=15.8 deg to determine the ratio P2/P1.

Further, the peak intensity P3 showing (101) face of $La(OH)_3$ appearing in the vicinity of: diffraction angle 2θ=28.3 deg, and P4 showing (110) face of $La(OH)_3$ appearing in the vicinity of: diffraction angle 2θ=27.5 deg were measured to determine the ratio P4/P3.

Further, in accordance with the known method of measuring the amount of metallic Ni (refer to Japanese Patent No. 2553616), magnetic fields were applied to specimens and the amount of metallic Ni contained in the alloy powders of each of the examples, etc. was measured by using VSM (Vibrating Specimen Magnetometer) measuring the magnetization of the specimen.

Further, nickel-metal hydride batteries to be described later were manufactured by using the alloy powders described above, and the internal resistance Ri of the batteries was measured. The internal resistance Ri of the battery was measured as described below. That is, after charging the battery to 60% of the full charge capacity, a current $I_{2.5}$ corresponding to 2.5 C ($I_{2.5}$=20 A in this example) was supplied for 5 sec, and the battery voltage $V_{2.5}$ was measured at the lapse of 5 sec. Then, current supply was interrupted for one min and then current $I_{12.5}$ ($I_{12.5}$32 100 A in this example) was supplied for 5 sec and the battery voltage $V_{12.5}$ was measured at the lapse of 5 sec. Then, the internal resistance Ri was determined according to the equation: $Ri=(V_{2.5}-V_{12.5})/(I_{12.5}-I_{2.5})$.

Further, for the nickel-metal hydride battery, a self-discharging test was conducted after storage for 8 months, to measure the residual capacity. Specifically, the battery was charged to 60% of the full charge capacity and left under a 65° C. circumstance for one month. After repeating the procedures by 8 times (that is after 8 month), the following self-discharging test was conducted. That is, the battery was charged to 60% of the full charge capacity and left in a 45° C. circumstance for 2 weeks. Then, discharging was conducted to measure the residual capacity.

The results are shown in Table 1.

It is considered that the precipitates of $La(OH)_3$ function as a corrosion resistant protective layer against electrolytes. Accordingly, it is considered that the self-discharging characteristics after long time storage are improved by the use of an alloy powder having a great amount of precipitates. This is supported also by that the residual capacity after long time storage was extremely lowered in Comparative Example 5 where precipitates were scarcely present and that the residual capacity was lowered also in Comparative Examples 3 and 4 with relatively small amount of precipitates and, on the other hand, that the residual capacity was increased in Examples 1 and 2 and Comparative Example 3 where a great amount of precipitates were present and the intensity ratio P2/P1 showed large values.

Further, while the intensity ratio P4/P3 showed a value of 1 or more (specifically, 1.1) in the alloy powder of Comparative Examples 3, 4, the intensity ratio P4/P3 was less than 1 (specifically, 0.9 or less) in the alloy powder of Examples 1 and 2 and Comparative Examples 1 and 2. From the foregoings, it can be seen that precipitates precipitated on the sur-

TABLE 1

| | Chemicals used for treatment | Treating time (Hrs) | Intensity ratio (P2/P1) | Intensity ratio (P4/P3) | Amount metallic Ni (wt %) | Battery internal resistance Ri (m Ω/cell) | Residual capacity (%) |
|---|---|---|---|---|---|---|---|
| Comp. Example 1 | NaOH35 wt % | 0.5 | 0.010 | 0.9 | 1.50 | 3.5 | 24 |
| Example 1 | ↑ | 1.0 | 0.036 | 0.8 | 2.50 | 3.4 | 40 |
| Example 2 | ↑ | 2.0 | 0.063 | 0.7 | 5.50 | 3.0 | 40 |
| Comp. Example 2 | ↑ | 6.0 | 0.085 | 0.8 | 12.0 | 3.7 | 40 |
| Comp. Example 3 | KOH35 wt % | 0.5 | 0.008 | 1.1 | 1.50 | 3.6 | 18 |
| Comp. Example 4 | ↑ | 2.0 | 0.012 | 1.1 | 2.50 | 3.3 | 24 |
| Comp. Example 5 | KOH 35 wt % + acetic acid | 2.0 + 0.5 | **** | **** | **** | 2.7 | 5 |

Treating temperature: 100° C.

According to Table 1, in the nickel-metal hydride batteries using each of the alloy powders as the negative electrode active material, batteries showing favorable value (40%) for the residual capacity were batteries using the alloy powders of Examples 1 and 2 and Comparative Example 2. On the other hand, with a view point of the battery internal resistance, it can be seen that batteries using the alloy powder of Examples 1 and 2 and Comparative Examples 4, 5 showed values as 3.4 mΩ/cell or less. Considering them collectively, it can be seen that the batteries using the alloy powder of Examples 1 and 2 have low battery internal resistance and show satisfactory storage characteristics with high residual capacity after long time storage.

Further, according to Table 1, the intensity ratio P2/P1 is larger in Examples 1 and 2 and Comparative Examples 1 and 2 treated with NaOH compared with Comparative Examples 3 and 4 using KOH. From the foregoings, it can be seen that more $La(OH)_3$ are precipitated and deposited on the surface of the alloy powder according to Examples 1 and 2 and Comparative Examples 1 and 2 compared with the alloy powder of Comparative Examples 3 and 4.

In Comparative Example 5, the peak intensity P2 showing the (100) face of $La(OH)_3$ could not be measured. This is considered to be attributable to that $La(OH)_3$ was scarcely precipitated and deposited on the surface of the alloy powder of Comparative Example 5.

face of the alloy powder according to Comparative Examples 3, 4 are crystals of $La(OH)_3$ with high a-axis orientation. On the contrary, it can be seen that crystals of $La(OH)_3$ of low a-axis orientation, that is, high c-axis orientation are present on the surface of alloy powder according to Examples 1 and 2 and Comparative Examples 1 and 2.

In Comparative Example 5, none of peak intensities P3 and P4 concerning $La(OH)_3$ could be measured. This is considered to be attributable to that $La(OH)_3$ were scarcely precipitated and deposited on the surface of the alloy powder of Comparative Example 5.

It can be seen that the intensity ratio P4/P3 is 0.8 or less to form crystals of strong c-axis orientation particularly, in Examples 1 and 2 and Comparative Example 1. It is considered that the function of the precipitates as the corrosion resistant protective layer against the electrolyte is made further excellent by precipitation of precipitates containing $La(OH)_3$ crystals of such high c-axis orientation, to increase the residual capacity.

Further, with reference to the amount of metallic Ni, it can be seen that the amount of metallic Ni is preferably within a range from 2.0 to 10 wt % in view of the comparison between Examples 1 and 2, and the comparative examples.

It is considered that metallic Ni acts as a catalyst in hydrogen absorption and desorption. Accordingly, it is considered that the internal resistance of the battery can be lowered by increasing the amount of metallic Ni to 2.0 wt % or more. However, since it is considered that the amount of alloy relevant to the charge/discharge becomes excessively small relatively in a case where the amount of metallic Ni is excessively large (for example, in the case of Comparative Example 2) which rather increases the internal resistance Ri of the battery, it can be seen that the amount is preferably 10 wt % or less.

Figure 4:
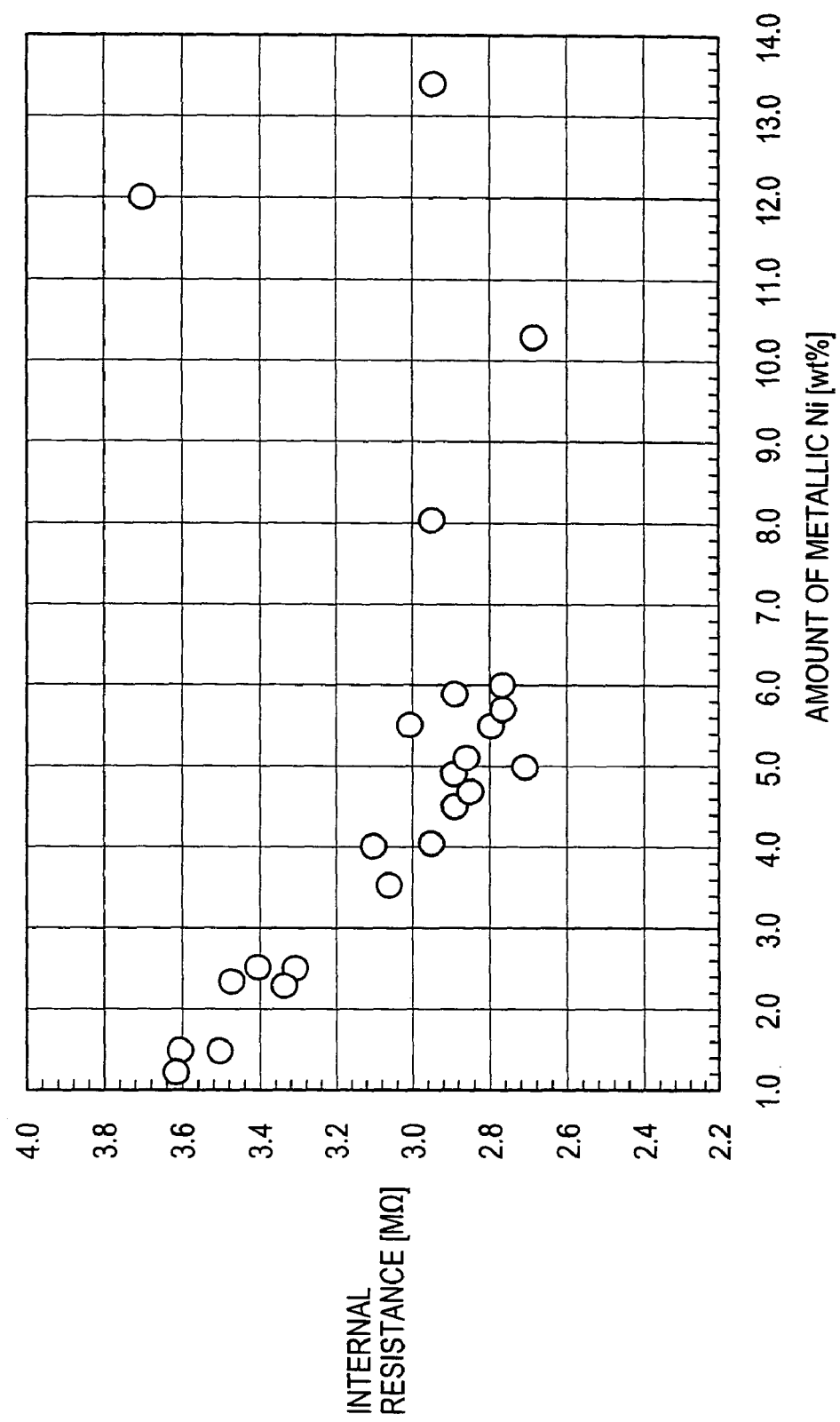
FIG. 4 is a graph showing a relation between the amount of metallic Ni contained in a hydrogen absorbing alloy powder and internal resistance Ri of a battery.

Further, various kinds of alloy powders applied with treatment by NaOH were prepared in the same manner as in Examples 1 and 2 and Comparative Examples 1 and 2, and a number of nickel-metal hydride batteries were manufactured by using them, and the internal resistance Ri of the batteries was measured. FIG. 4 shows a relation between the amount of metallic Ni in the alloy powder used for the battery and the internal resistance Ri of the battery.

The method of measuring the internal resistance Ri of the battery is as described above.

According to the graph of FIG. 4, it can be seen that the internal resistance Ri of the battery is gradually lowered along with increase in the amount of metallic Ni of the alloy powder up to about 6.0 wt % of the amount of metallic Ni. However, in a case where the amount of metallic Ni exceeds 6.0 wt % it can be seen that the internal resistance Ri of the battery varies greatly and no further improvement can be expected for the internal resistance Ri. That is, it can be said that the amount of metallic Ni is not necessarily increased in excess of 6.0 wt %. On the other hand, as can be seen in view of Table 1, since it is necessary to take a longer time for NaOH treatment in order to increase the amount metallic Ni, it can be seen that the treating time by NaOH can be shortened by decreasing the amount of metallic Ni. Accordingly, it can be seen that the amount of metallic Ni is, further preferably, from 2.0 wt % to 6.0 wt % in conjunction with the consideration on the internal resistance Ri of the battery described above.

Then, hydrogen absorbing alloys in which the weight Wc of Co based on the weight Wn of Ni contained was changed from that of alloys for preparing Example 1, etc. were manufactured, and the hydrogen absorbing alloy powders (Examples 3, 4, 5) were manufactured in the same manner and nickel-metal hydride batteries were manufactured. For the hydrogen absorbing alloy powder and the nickel-metal hydride battery, the amount of metallic Ni for the alloy powder, the internal resistance, and the residual capacity after long time storage of the batteries were measured in the same manner as described above. The results are shown in Table 2.

As the NaOH treatment, metal powders prepared from ingots were immersed in an aqueous solution at 100° C. containing 35 wt % of NaOH and stirred for one hour in the same manner as in Example 1.

TABLE 2

| No. | Wc/Wn | P2/P1 | Amount metallic Ni wt % | Battery internal resistance (m Ω/cell) | Residual capacity (%) |
|---|---|---|---|---|---|
| Example 1 | 0.21 | 0.036 | 2.5 | 3.4 | 40 |
| Example 3 | 0.10 | 0.042 | 3.6 | 3.2 | 40 |
| Example 4 | 0.07 | 0.044 | 4.0 | 3.2 | 40 |
| Example 5 | 0.05 | 0.055 | 4.2 | 3.2 | 40 |

Treating condition: NaOH 35 wt %, 100° C. × 1 hr

According to Table 2, any batteries using the respective alloy powders of Example 1 and Examples 3, 4, and 5 equally has favorable storage characteristics with a view point of residual capacitance. On the other hand, with respect to the battery internal resistance, it can be somewhat lower in Examples 3, 4, and 5 than in Example 1. Accordingly, it can be seen that the ratio of weight Wc of Co based on weight Wn of Ni, that is, Wc/Wn is preferably: Wc/Wn≦0.10.

Further, according to Table 2, it can be seen that as Wc/Wn, the ratio of the weight Wc for Co based on the weight Wn for Ni is smaller, that is, as the amount of Co decreases, P2/P1 can be increased and the amount of metallic Ni can be increased for the same treating time. Accordingly, as Wc/Wn is smaller, NaOH treatment can be made in a shorter time. Accordingly, it is preferred that Wc/Wn≦0.05 in the alloy powder.

The alloy powders in Examples 1 and 2 and, further, Examples 3, 4, and 5 can lower the battery internal resistance and improve the self-discharging characteristics after long time storage (residual capacity) in nickel-metal hydride batteries using them as the negative electrode active material.

The nickel-metal hydride battery having the negative electrode using the alloy powder according to the example, etc. as the negative electrode active material may have a known constitution and the outline thereof will be described below with reference to FIG. 5 and FIG. 6.

Figure 5:
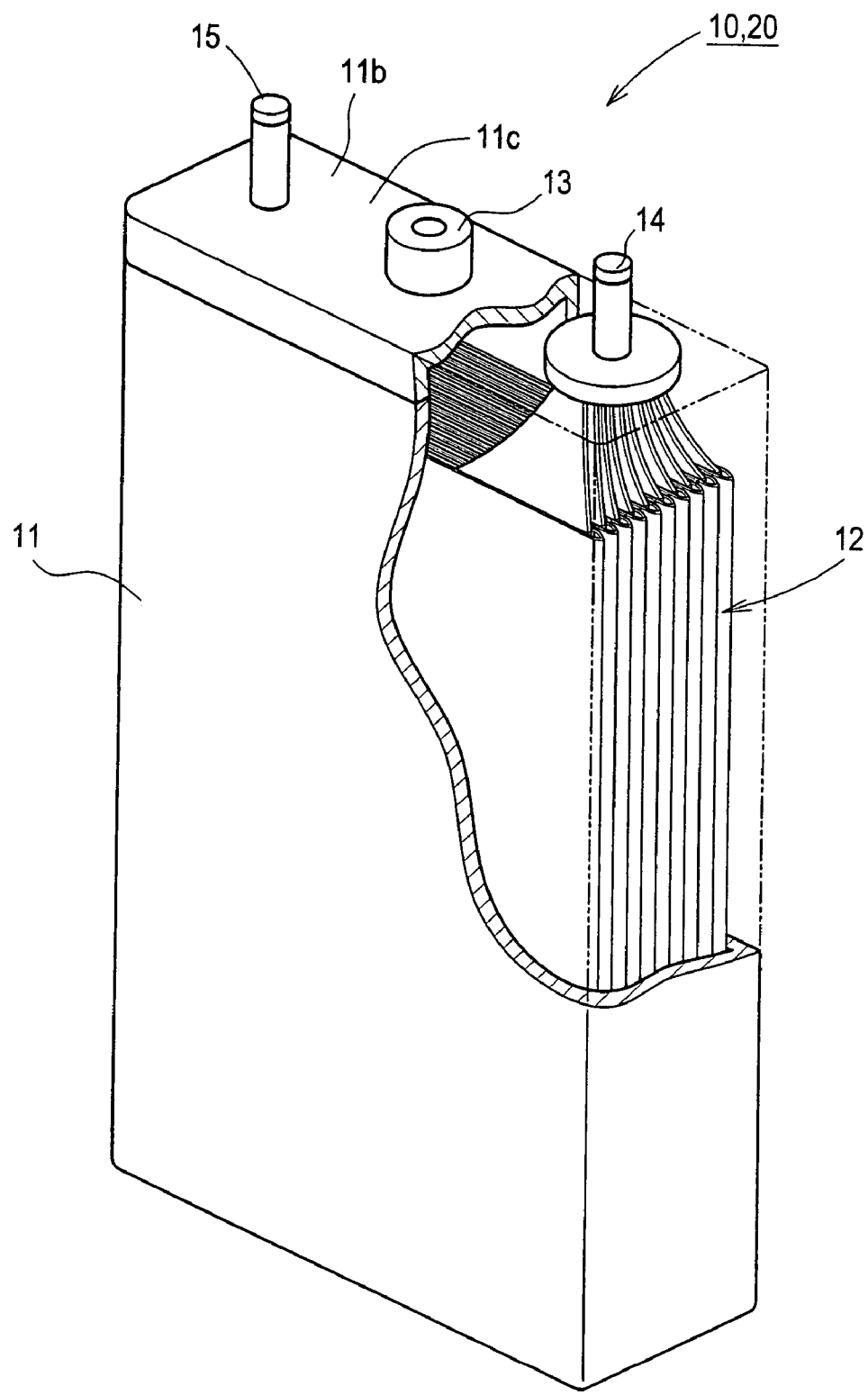
FIG. 5 is a partially cutaway perspective view of a nickel-metal hydride battery having a negative electrode using the hydrogen absorbing alloy powder of Example 1 as a negative electrode active material.

As shown in FIG. 5, a nickel-metal hydride battery 10 is a square tightly sealed alkali battery including a square metal casing 11 having a lid 11b, a group of electrode plates 12 arranged in the casing 11 and electrolyte (not illustrated), a safety valve 13 fixed to the lid 11b, a positive electrode terminal 14 and a negative electrode terminal 15.

Figure 6:
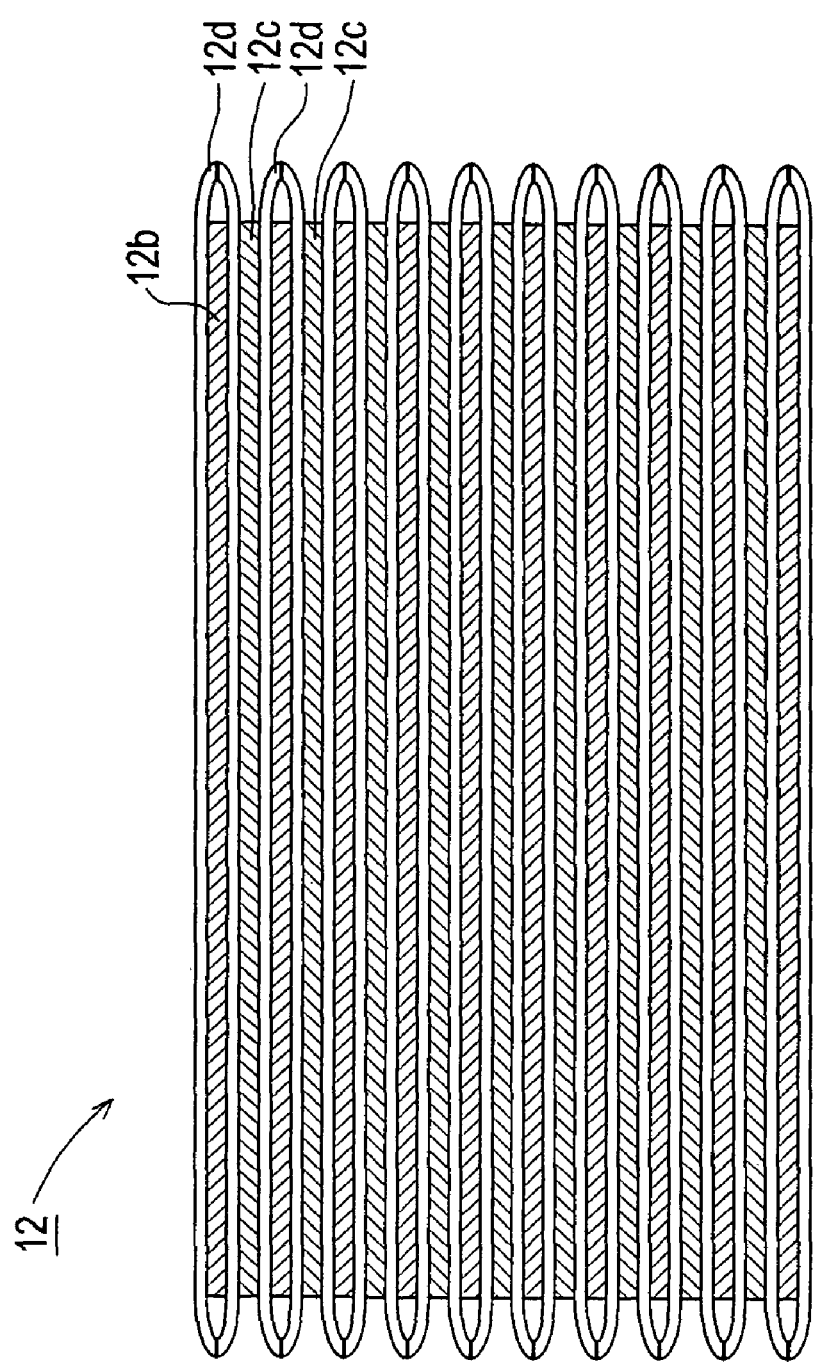
FIG. 6 is a cross sectional view showing the state of a positive electrode, a negative electrode, and a separator in the battery shown in FIG. 5.

As shown in FIG. 6, the electrode plate group 12 has a bag-shaped separator 12d (not hatched) and a positive electrode 12b and a negative electrode 12c. Among them, the positive electrode 12b is inserted in the bag-shape separator 12d, and the positive electrode 12b inserted in the separator 12d and the negative electrode 12c are stacked alternately.

The positive electrode 12b comprises an active material support, a positive electrode active material supported on the active material support, and an additive. The active material support comprises an expanded nickel that also functions as a current collector. Further, nickel hydroxide was used for the positive electrode active material and metallic cobalt was used for the additive. Specifically, an active material paste containing nickel hydroxide as the positive electrode active material and metallic cobalt as the additive was filled in the expanded nickel (active material support) and dried, pressed and cut to prepare the positive electrode 12b.

On the other hand, the negative electrode 12c has an active material support comprising a punched metal, and a negative electrode active material supported on the active material support. Specifically, a paste containing a hydrogen absorbing alloy powder according to the examples, etc. as the negative electrode active material was coated on a punched metal (active material support), dried, pressed and cut to prepare the negative electrode 12c.

For the separator 12d, a non-woven fabric comprising synthetic fibers applied with a hydrophilic treatment was used. Specifically, a polyolefinic non-woven fabric applied with hydrophilic property by sulfonation was used as the separator 12d.

Further, an aqueous alkali solution of 1.3 specific gravity comprising KOH as the main ingredient of solute was used as the electrolyte.

The nickel-metal hydride battery 10 was a battery of low battery internal resistance and having favorable self-discharging characteristics after long time storage as described above (refer to Tables 1 and 2) by using the hydrogen absorbing alloy powder according to the examples described above as the negative electrode active material for the negative electrode 12c.

The hydrogen absorbing alloy powder and the battery using the same according to the present invention have been described with reference to examples, but the invention is not restricted only to such examples and it will be apparent that the invention can be properly modified within a range not departing the scope of the invention.

For example, while the battery of the form shown in FIG. 5 has been exemplified as the nickel-metal hydride battery, the invention is applicable also to other forms of batteries, for example, using a resin casing.

What is claimed is:

1. A hydrogen absorbing alloy powder, comprising:
an intermetallic compound having an $AB_5$ type crystal structure and containing La for an A site element and Ni for a B site element; and
metallic Ni liberated from the intermetallic compound, wherein:
the powder contains La by 20 wt % or more and metallic Ni by 2.0 wt % to 10 wt %,
the powder has an exterior surface,
acicular or grain shape precipitates containing $La(OH)_3$ are deposited on the exterior surface of the powder, and
the powder has an intensity ratio P2/P1 satisfying a relation: P2/P1$\geq$0.02, where P1 is a peak intensity appearing in the vicinity of: diffraction angle 2θ=42.5 deg and showing (111) face of $LaNi_5$ and P2 is a peak intensity appearing in the vicinity of: diffraction angle 2θ=15.8 deg and showing (100) face of $La(OH)_3$ in an X-ray diffractometry using CuKα rays.

2. The hydrogen absorbing alloy powder according to claim 1, wherein the powder has an intensity ratio P4/P3 satisfying a relation: P4/P3$\leq$0.9, where P3 is a peak intensity appearing in the vicinity of: diffraction angle 2θ=28.3 deg and showing (101) face of $La(OH)_3$ and P4 is a peak intensity appearing in the vicinity of: diffraction angle 2θ=27.5 deg and showing (110) face of $La(OH)_3$ in the X-ray diffractometry using CuKα rays.

3. The hydrogen absorbing alloy powder according to claim 1, wherein the powder contains the metallic Ni by 2.0 wt % to 6.0 wt %.

4. The hydrogen absorbing alloy powder according to claim 1, wherein a weight ratio Wc/Wn for the weight Wc of Co and the weight Wn of Ni contained in the hydrogen absorbing alloy powder is: Wc/Wn$\leq$0.10.

5. A nickel-metal hydride battery using the hydrogen absorbing alloy powder according to claim 1 as a negative electrode active material.

* * * * *